Figure 1:
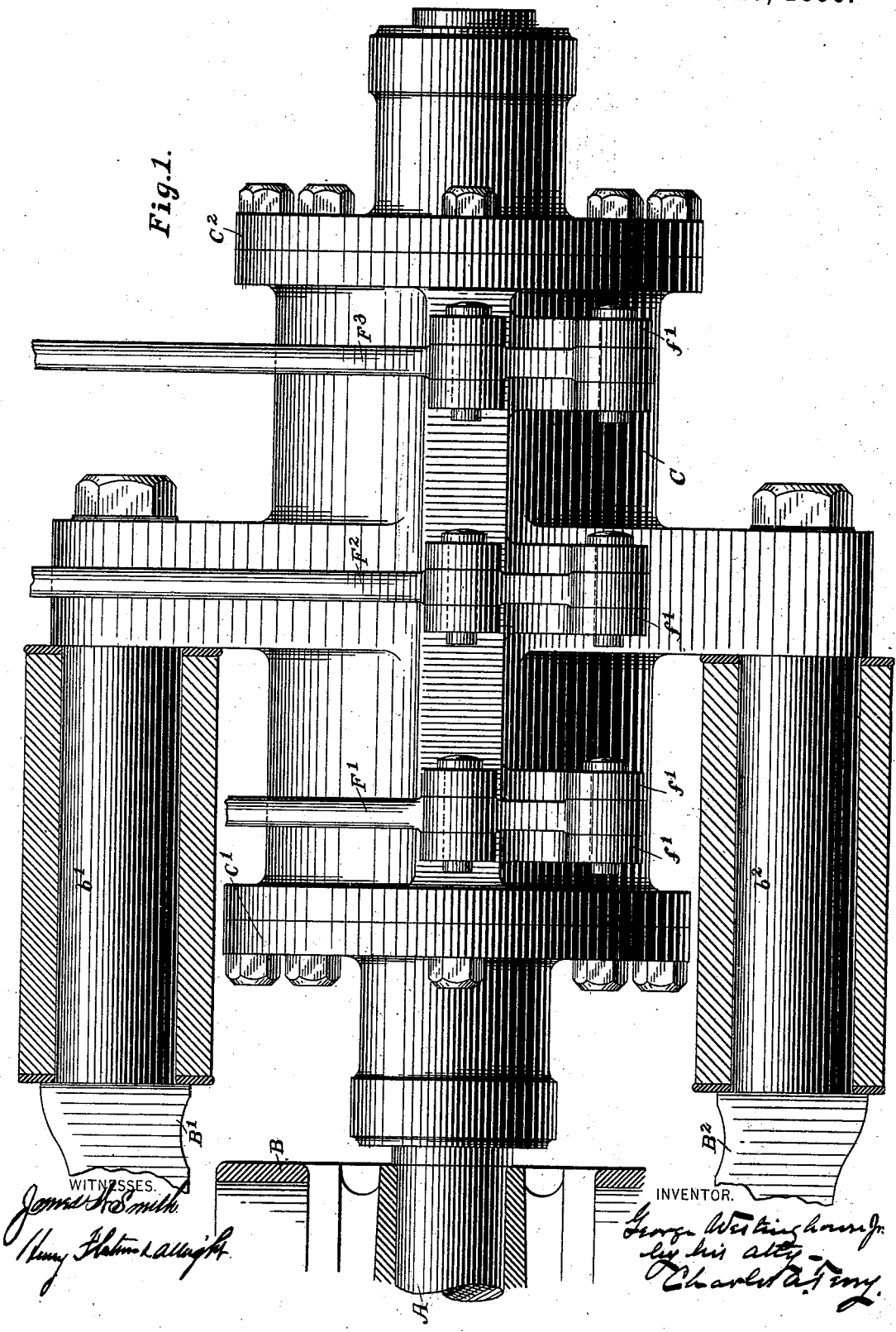

(No Model.)

G. WESTINGHOUSE, Jr.
ROTARY PUMPING AND MOTOR APPARATUS.

No. 550,466. Patented Nov. 26, 1895.

WITNESSES. INVENTOR.

(No Model.) 5 Sheets—Sheet 2.

G. WESTINGHOUSE, Jr.
ROTARY PUMPING AND MOTOR APPARATUS.

No. 550,466. Patented Nov. 26, 1895.

WITNESSES.

INVENTOR.

(No Model.) 5 Sheets—Sheet 3.

G. WESTINGHOUSE, Jr.
ROTARY PUMPING AND MOTOR APPARATUS.

No. 550,466. Patented Nov. 26, 1895.

(No Model.) 5 Sheets—Sheet 4.

G. WESTINGHOUSE, Jr.
ROTARY PUMPING AND MOTOR APPARATUS.

No. 550,466. Patented Nov. 26, 1895.

Witnesses
Inventor
Attorney (No Model.) 5 Sheets—Sheet 5.
G. WESTINGHOUSE, Jr.
ROTARY PUMPING AND MOTOR APPARATUS.

No. 550,466. Patented Nov. 26, 1895.

UNITED STATES PATENT OFFICE.

GEORGE WESTINGHOUSE, JR., OF PITTSBURG, PENNSYLVANIA.

ROTARY PUMPING AND MOTOR APPARATUS.

SPECIFICATION forming part of Letters Patent No. 550,466, dated November 26, 1895.

Application filed July 16, 1890. Serial No. 358,971. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Rotary Pumping and Motor Apparatus, (Case No. 420,) of which the following is a specification.

The invention herein described relates to certain improvements in the construction of rotary pumping and motor apparatus, and these improvements are particularly applicable where the power to drive the same is derived from machinery that is run at an approximately constant speed or where the motion is derived from an electric motor, which necessarily has the greatest efficiency when run at its proper constant speed; but they are also applicable when driven by machinery run at variable speeds.

As an illustration, the invention will be described as applied to a pump, though, as will be hereinafter explained, many of the features are equally applicable to rotary motors.

The invention in general construction is like that class of rotary engines wherein a drum is revolved within a case, the case being bored with its axis eccentric to that of the drum and of such diameter that at one point the drum is close to the bore of the case, while at the opposite side there is a considerable space. The drum (as in the case of rotary engines or motors of this class) is provided with pistons or extensory paddles, which are hinged to or slide in and out of the drum, so as to move practically in contact with the bore of the case. The drum forms part of the shaft, which may extend through one or both heads of the case. When fluid under pressure is admitted to one side of the case, it acts upon the pistons or extensory paddles carried by the drum and causes it to revolve, the fluid escaping through suitable ports in the opposite side of the case after performing its work. If power is applied to the shaft of such a drum and it is caused to revolve, it then becomes a pumping apparatus for the movement of fluid and will deliver a constant quantity when driven at a constant speed. To effect a variation in the pumping capacity of an apparatus of this kind when driven at a constant speed, it is necessary to have some means to adjust the bore of the case, so that it may be more or less eccentric to that of the drum, and it is this adjustability of the bore of the case with reference to that of the drum which forms the particular feature of this invention.

In the form illustrated by the drawings the drum revolves in the two heads bolted to an inclosing case, the drum being provided with pistons or extensory paddles, which lie in planes passing through the drum and which are free to move in their own planes during the rotation of the cylinder. Within this case is arranged an adjustable cylinder, and within this cylinder these pistons or extensory paddles operate in the same manner as if this cylinder formed part of the case. This cylinder divides its inclosing case into two compartments, the spaces between the cylinder and the case forming the chambers into which the pipe or port connections are made. When the drum is revolved within the cylinder and one side of the case is supplied through a suitable pipe with liquid, it will cause that liquid to be forced into the opposite division of the case and through its pipe connection to the point of application.

The range of movement of the adjustable cylinder is in some cases such that its bore may be placed eccentric to the center of the drum in an equal amount in two directions, so that when in one position it will pump the liquid in a certain direction, but if moved to the opposite position the flow of the liquid will be reversed. Between these two limits any required variation may be obtained in the direction or quantity of liquid being effectively pumped.

The movement of the adjustable cylinder reduces the effective area of the pump abutments or pistons, so that a given power applied to the shaft of the drum will have the effect of moving a small quantity of liquid at a great pressure or a larger quantity at a less pressure, or a variable quantity at a given pressure may be pumped with a corresponding variation in the force applied to the shaft of the drum.

So far the invention has been described with reference to a single pumping apparatus driven by one shaft. It is part of the invention to combine two or more of these pumping arrangements of equal or different capacities within one or more cases. However, in some instances where two pumps are used an adjustable cylinder is required in only one of the pumps.

In those instances where two pump-cylinders are employed upon the same shaft the combined effort of the two may be used for a common purpose, and the ports may then be arranged so that the pressure upon one side of the portion of the drum surrounded by one cylinder will be counterbalanced by the corresponding pressure on the opposite side of the drum surrounded by the next cylinder. If the object to be obtained is simply the variation in the quantity of the liquid pumped, then one cylinder may be fixed with reference to its drum, in which case the movement of the adjustable cylinder with reference to the other drum will cause a portion of the liquid to be pumped backward by that pump, and the quantity may be as much as is pumped forward by the other, having the effect of simply moving the liquid within the case without causing any movement of the liquid within the pipes attached thereto. Not only may two or more pumps be employed for doing work in common, both being driven by the same power, but two or more pumps may be employed for doing independent work, each being driven by an independent shaft, or they may be arranged upon the same shaft for doing independent work, since each pump may be independently regulated. Two or more independent pumps of this character are useful for operating traveling cranes, elevators, street-cars, and for various other purposes which will readily suggest themselves.

The improvements described are also of advantage for use in rotary motors—for instance, when a motor for doing a variable amount of work is operated by fluid under practically constant pressure, in which case the sliding or adjustable cylinder may be moved either by hand or automatically, so as to maintain any required speed by varying the consumption of fluid.

The reversibility of the action of the adjustable cylinder renders it especially useful in connection with elevators for buildings, and particularly where two or more elevators are to be run from a common source of power. In this case each elevator will have its particular pumping apparatus, which will, for the purpose of raising the elevator, force the required liquid directly into the hydraulic cylinder used for that purpose, and the movement of the elevator can thus be entirely regulated by moving the sliding cylinder. When it is desired to descend, the apparatus with reference to this one elevator then becomes motor, and the pressure exerted by the discharging fluid will have the effect of assisting the other pumps, thus utilizing the energy that is wasted with all ordinary forms of hydraulic elevator apparatus. Further, pumping the liquid directly into the hydraulic cylinder effects an economy, because the resistance to the pump is only that due to the load.

Some forms of the invention will now be more particularly described in connection with the accompanying drawings.

Figure 2:
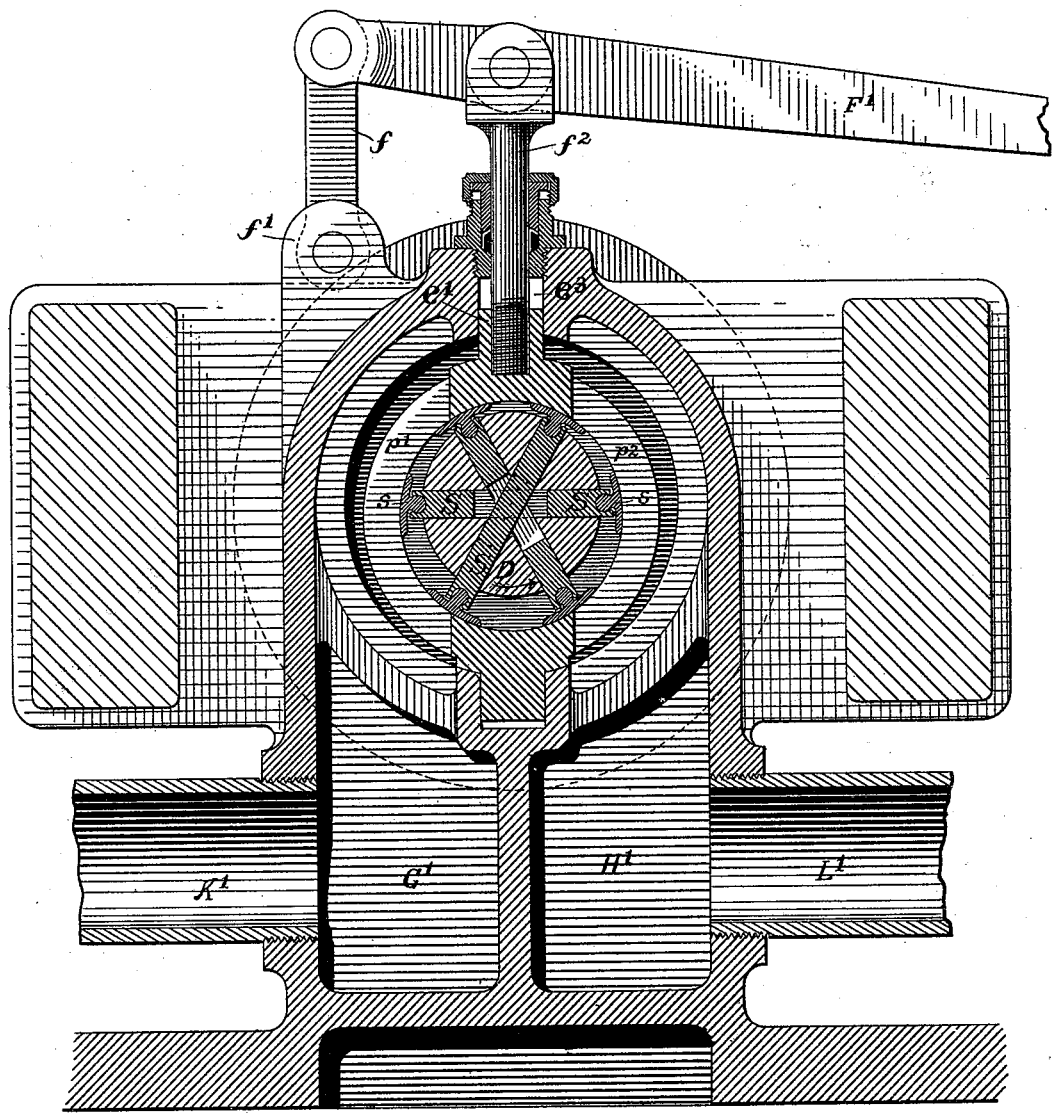
Figure 3:
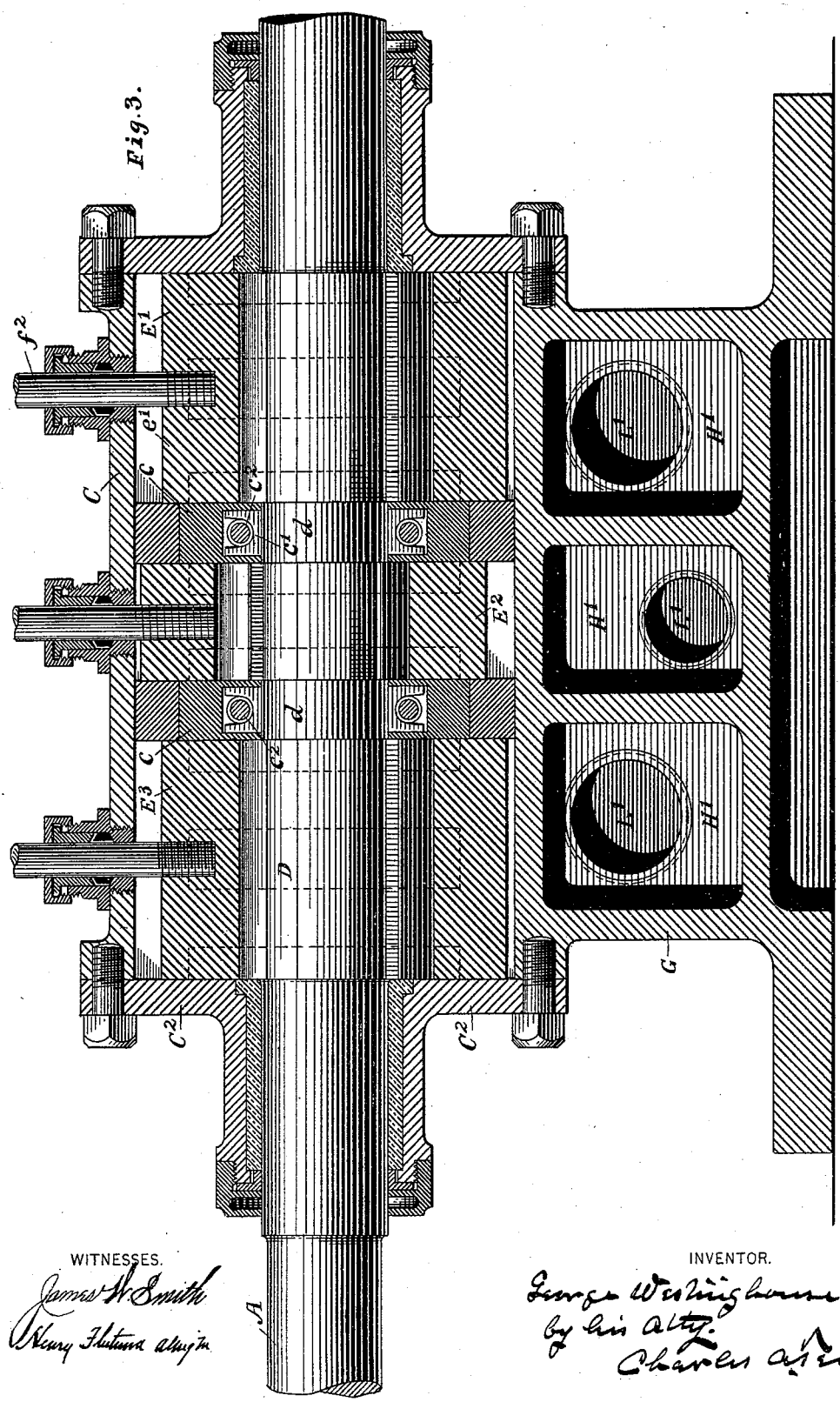
Figure 4:
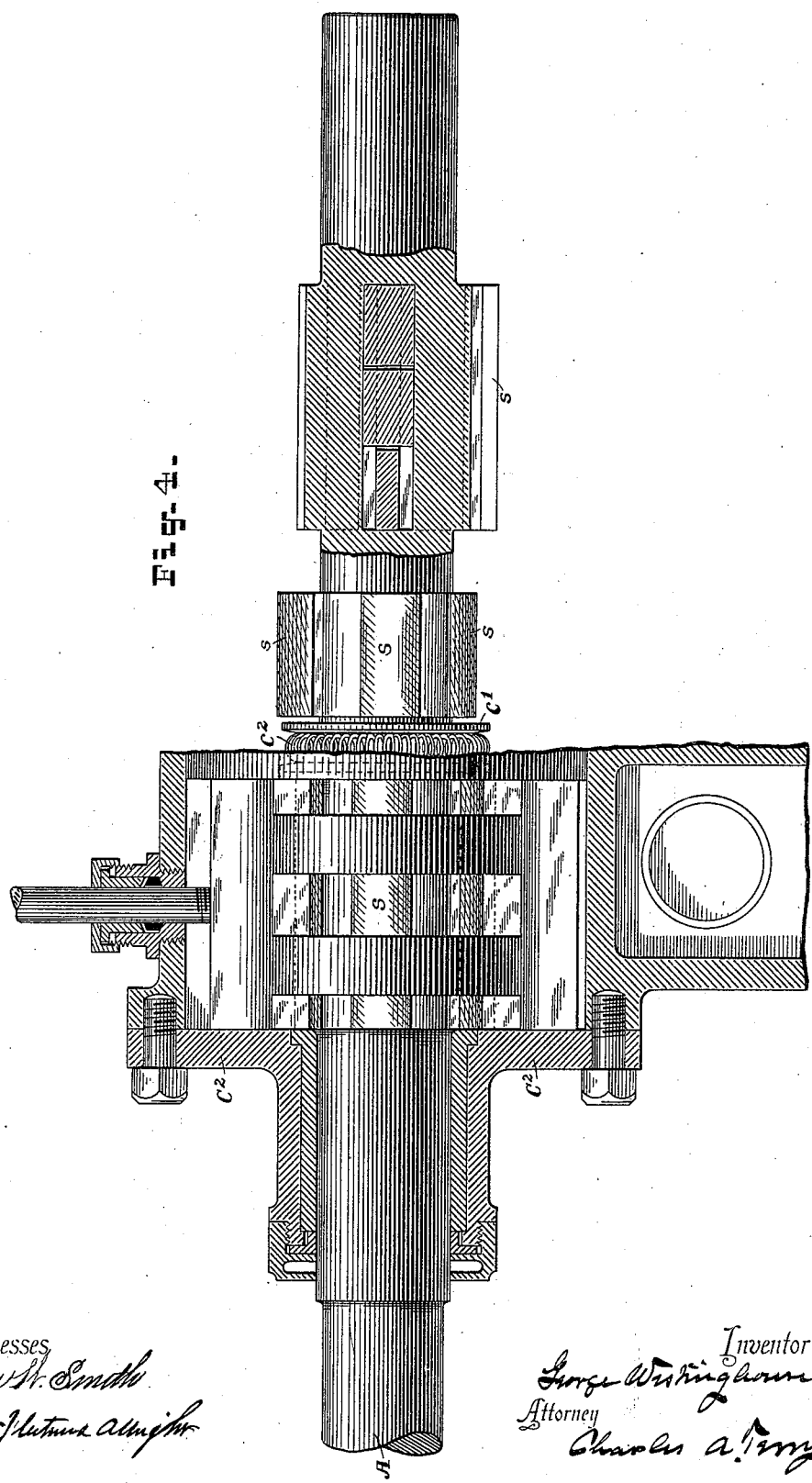
Figure 5:
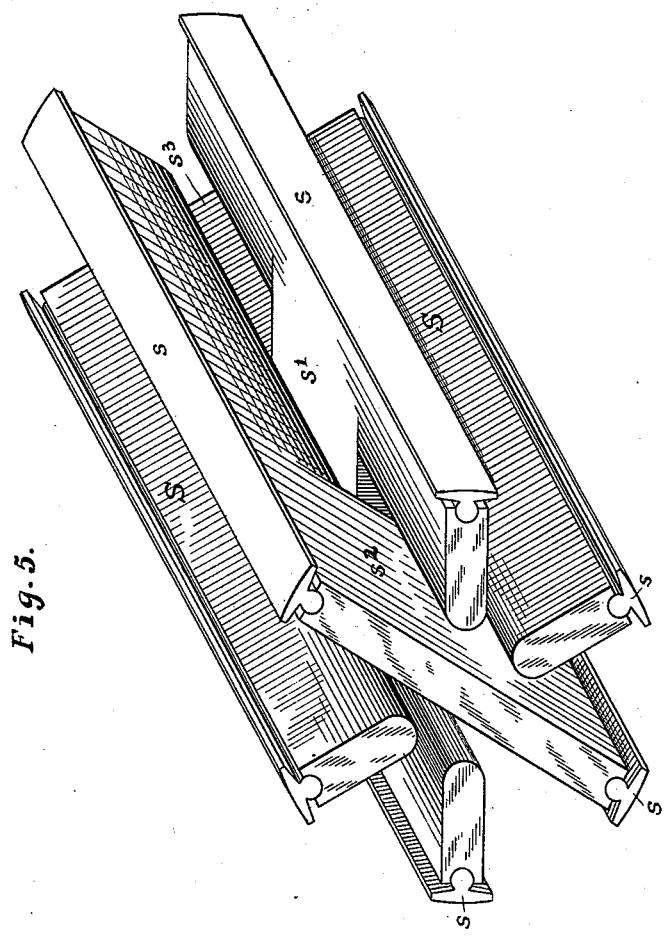

In the accompanying drawings, Figure 1 is a plan of a device embodying the essential principles of the invention. Fig. 2 is a cross-section; and Fig. 3 is a side elevation of the same, partly in section. Fig. 4 is a side view partly in section, and Fig. 5 is a perspective showing the relation of the slides to each other.

Referring to the drawings, A represents a shaft which may be driven when used as a pumping device at any required speed by means of a suitable power-motor—such, for instance, as an electric motor—the armature B of which may be of any suitable construction. The shaft A is represented as extending between the arms $b'\ b^2$ of the field-magnet $B'\ B^2$ of the motor, and it passes within a suitable inclosing case C for the pump. The shaft A may carry the armature B of the motor, or it may be otherwise connected therewith, and, as shown, the metal of the rotary pump or engine may constitute the back piece or yoke of the field-magnet. A slotted drum D forms part of the shaft A, and it extends from the head $C'$ to the head $C^2$ of the case C. This drum is surrounded by one or more cylinders $E'\ E^2\ E^3$, which are of larger external diameter than the drums D and are independently adjustable within the case C with reference to the drum. For the purpose of separating the cylinders from each other the drum may be made with annular grooves $d$, which receive dividing-plates $c$, fitting within the case C. These serve as partition-walls between the respective cylinders. Packing-rings $c'$ may be used to prevent the fluid from leaking from one chamber to the next. In the drawings a spiral spring $c^2$ is shown in each instance for binding the two sections of packing firmly against the confronting surfaces of the drum.

The drum D is provided with suitable pumping-pistons or extensory paddles. In the drawings there are shown pistons S, which pass diametrically through and project from the drum in radial directions and carry packing-plates $s$, which slide against the inner surface of the cylinder. The packing plate or strip $s$, carried by any given piston, moves at all times upon the inner surface of the cylinder. If the drum is concentric with the cylinder, then there will be no relative movement of the pistons and the drum when the latter is revolved. If the cylinder be moved so its bore is eccentric to the drum, then the pistons will move to and fro in their planes as the drum revolves, always closing the space between the drum and the adjacent portion of the cylinder. Fig. 5 shows the pistons S which operate in the drum. These are notched in their centers, as indicated, so as to permit of the required motion. Other plans of pistons, the equivalent of these pistons, may be employed, as found desirable. It is evident, therefore, that the position of the cylinder with reference to the drum will determine the size of the compartments between the successive pistons, and therefore the amount of fluid carried between any two pistons during a revolution of the drum.

The cylinders $E'$ $E^2$ $E^3$ (shown in cross-section in Fig. 2) are respectively provided with levers $F'$ $F^2$ $F^3$, by means of which their positions with reference to the corresponding portions of the drum may be adjusted. Thus the cylinder $E'$ may be held in the position shown in the drawings, so that its axial line is as far as possible removed from the axial line of the drum, or it may be raised until it is concentric with the drum, or it may be carried upward until its axis is upon the other side of the axis of the drum and at a distance therefrom equivalent to the distance occupied in the first instance. The lever $F'$ is pivoted to a link $f$, which in turn is pivoted to the lugs $f'$ upon the casting C. The lever $F'$ (see Fig. 2) carries a rod $f^2$, which passes through a suitable packed opening in the case C, and is screwed into or otherwise fastened to the lug $e'$, formed upon the cylinder $E'$. This lug $e'$ enters a longitudinal groove $e^3$, formed in the casing C, and constitutes a division-wall between the space left between the cylinder $E'$ and the case C. A similar lug $e'$ and groove $e^3$ at the bottom of the case form a division-wall below. In this manner the space between the cylinder and the case is divided into two chambers.

Ports are formed through the walls of the respective cylinders $E'$ $E^2$ $E^3$ upon the opposite sides, as indicated at $p'$ $p^2$. The ports $p'$ communicate with the chambers upon one side of the cylinder and the ports $p^2$ communicate with the chambers upon the other side. If the drum be supposed to revolve in a given direction, as indicated by the arrow, Fig. 2, fluid will be drawn through the ports $p'$ into the space between the drum D and the cylinder, and it will be carried forward by the revolving pistons S.

If the cylinder be eccentric with reference to the drum, then the space inclosed between the successive pistons will be dependent upon the degree of eccentricity, from which it follows that the amount of fluid carried forward by the revolution of the drum D—that is to say, the amount of fluid pumped—will depend upon the extent of the eccentricity of the cylinder. If the cylinder be moved so that its axis coincides with that of the drum, then the amount of fluid taken back upon the upper side of the drum will be exactly equivalent to that carried forward by the lower side. If the cylinder be moved to such a position that its axis is upon the side of the axis of the drum opposite to that in the first instance, then fluid will be pumped in the opposite direction.

The case C is shown as being provided with a base G, having compartments $H'$ and $G'$, which communicate, respectively, with the chambers formed by the walls of the cylinders $E'$ $E^2$ $E^3$ and the case C. Pipes $K'$ lead into the chamber $G'$, and pipes $L'$ communicate in like manner with the chambers $H'$. The several pipes $K'$ may all lead into one chamber or into individual chambers, according to the character of the work to be performed by the pumps. The same is true of the pipes $L'$.

The same general construction, as already described in connection with the cylinders $E'$, is carried out with reference to the cylinders $E^2$ and $E^3$.

It is evident that if the fluid in one chamber or set of chambers $H'$ be placed under pressure by external force then the apparatus will act as a fluid-engine and as such can be readily regulated.

The pipes $K'$, as well as the pipes $L'$, may be variously interchanged and connected for producing variations in quantity and pressure.

The shaft and drum D may be made in one piece and the slots for the pistons or abutments may be cut into it or the drum may be made up in section and united in any suitable manner.

I claim as my invention—

1. In a rotary pump or engine the combination of a shaft revolving in fixed journals, extensory paddles mounted on the said shaft, a cylinder inclosing said paddles, lugs on the said cylinder parallel to a diameter thereof, fixed guides inclosing said lugs, and means for moving the said cylinder along the said guides, substantially as described.

2. In a rotary pump or engine, the combination of a shaft revolving in fixed journals, extensory paddles mounted in a drum on said shaft, a cylinder inclosing said paddles, lugs on said cylinder parallel to a diameter thereof, fixed guides inclosing the said lugs, an arm secured to said cylinder between said guides and a lever for moving said arm, substantially as described.

3. In a rotary pump or engine, the combination of a shaft revolving in fixed journals, extensory paddles mounted on said shaft, a cylinder inclosing said paddles, a surrounding case inclosing said cylinder, lugs on said cylinder constituting division walls dividing the space between the cylinder and the inclosing case, guides formed in the case for receiving said lugs and means for moving said cylinder along said guides, substantially as described.

4. In a rotary pumping apparatus or engine, the combination of a revolving shaft, drums carried thereby, radial pistons carried upon the respective drums, an inclosing cylinder for each drum, and independent adjusting devices for moving the respective cylinders, said drums modifying each other according to adjustment, substantially as described.

5. In a rotary pumping device or engine, the combination of a fixed support, a revolving shaft having its axis of revolution fixed with reference to the support, multiple sets of pistons driven by the shaft, inclosing cylinders for the respective sets of pistons, and independent adjustments for moving the respective cylinders.

6. In a rotary pumping apparatus, the combination of a revolving drum, two sets of piston-slides carried thereby and independent cylinders surrounding the respective sets of piston-slides, one of said cylinders being adjustable with reference to its set of piston-slides, substantially as described.

7. In a rotary pumping apparatus, the combination of two sets of radial pumping piston-slides, corresponding drum-sections carrying the same, cylinders surrounding the respective sets of piston-slides, one of said cylinders being adjustable with reference to its piston-slides, and ports in the respective cylinders, corresponding ports of each cylinder communicating with each other, substantially as described.

In testimony whereof I have hereunto subscribed my name this 12th day of July, A. D. 1890.

GEO. WESTINGHOUSE, JR.

Witnesses:
W. D. UPTEGRAFF,
CHARLES A. TERRY.